No. 825,330. PATENTED JULY 10, 1906.
G. R. LIVERGOOD.
AUTOMATIC STREET OR STATION INDICATOR AND ADVERTISER.
APPLICATION FILED JULY 25, 1905.

3 SHEETS—SHEET 1.

Witnesses:
Loto Vigus
John H Wilson

Inventor:
Gerald R. Livergood
By his Attorney
Eugene Ayres.

No. 825,330. PATENTED JULY 10, 1906.
G. R. LIVERGOOD.
AUTOMATIC STREET OR STATION INDICATOR AND ADVERTISER.
APPLICATION FILED JULY 25, 1905.

3 SHEETS—SHEET 2.

Witnesses:
Loto Vigue
John H. Wilson

Inventor:
Gerald R. Livergood,
By his Attorney
Eugene Ayres.

No. 825,330. PATENTED JULY 10, 1906.
G. R. LIVERGOOD.
AUTOMATIC STREET OR STATION INDICATOR AND ADVERTISER.
APPLICATION FILED JULY 25, 1905.

3 SHEETS—SHEET 3.

Witnesses:
Loto Vigue
John H. Wilson

Inventor:
Gerald R. Livergood,
By his Attorney
Eugene Ayres.

UNITED STATES PATENT OFFICE.

GERALD R. LIVERGOOD, OF ST. JOSEPH, MISSOURI, ASSIGNOR OF ONE-HALF TO J. H. CARGILL, OF ST. JOSEPH, MISSOURI.

AUTOMATIC STREET OR STATION INDICATOR AND ADVERTISER.

No. 825,330.  Specification of Letters Patent.  Patented July 10, 1906.

Application filed July 25, 1905. Serial No. 271,170.

*To all whom it may concern:*

Be it known that I, GERALD R. LIVERGOOD, a citizen of the United States, residing at St. Joseph, in the county of Buchanan and State of Missouri, have invented certain new and useful Improvements in Automatic Street or Station Indicators and Advertisers; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a positive automatic mechanism to be used in street or railway cars that will indicate the streets or stations as they are approached by the cars and that with the name of each street or station will simultaneously show a separate advertisement.

I attain my object by the mechanism illustrated in the accompanying drawings, in which—

Figure 1:
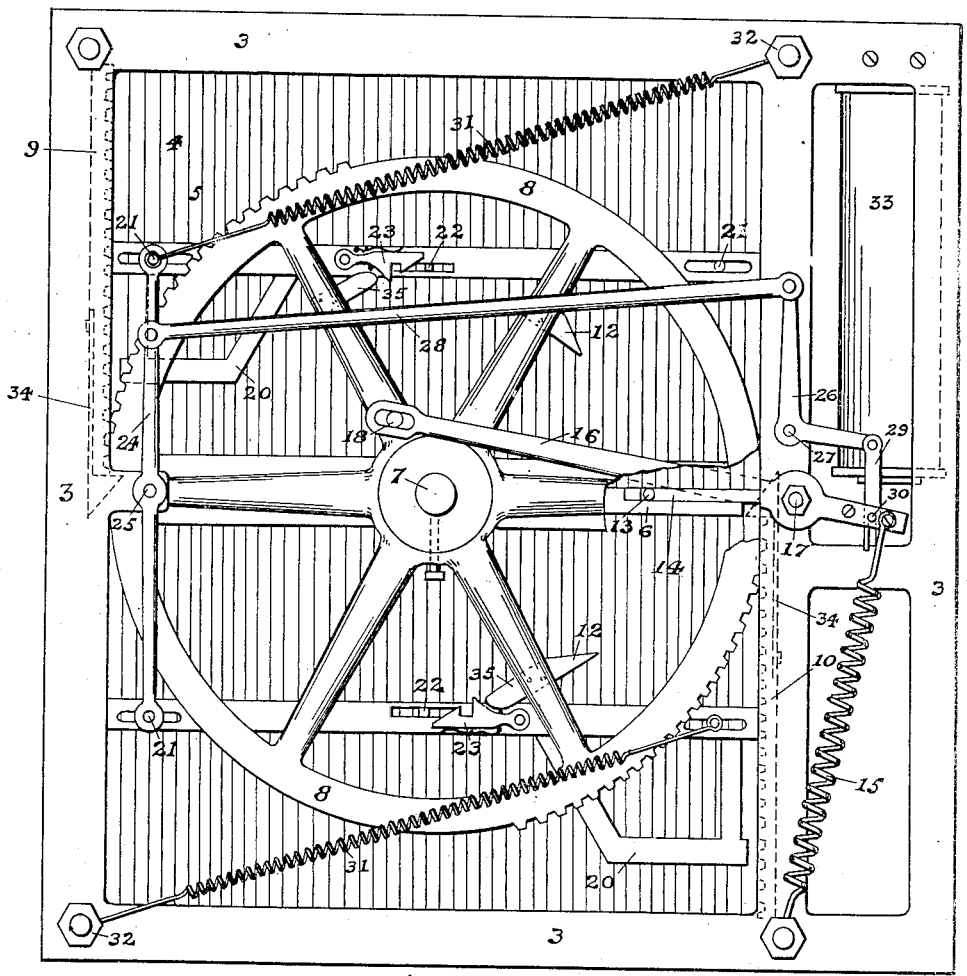
Figure 2:
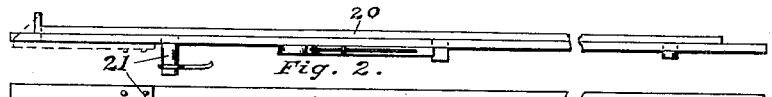
Figure 3:
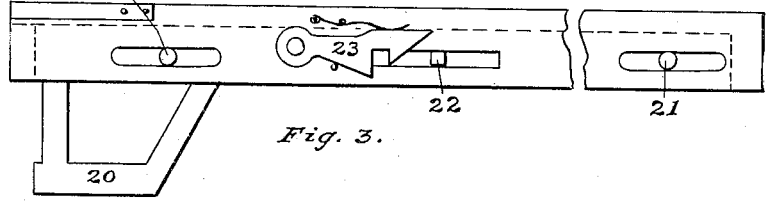
Figure 4:
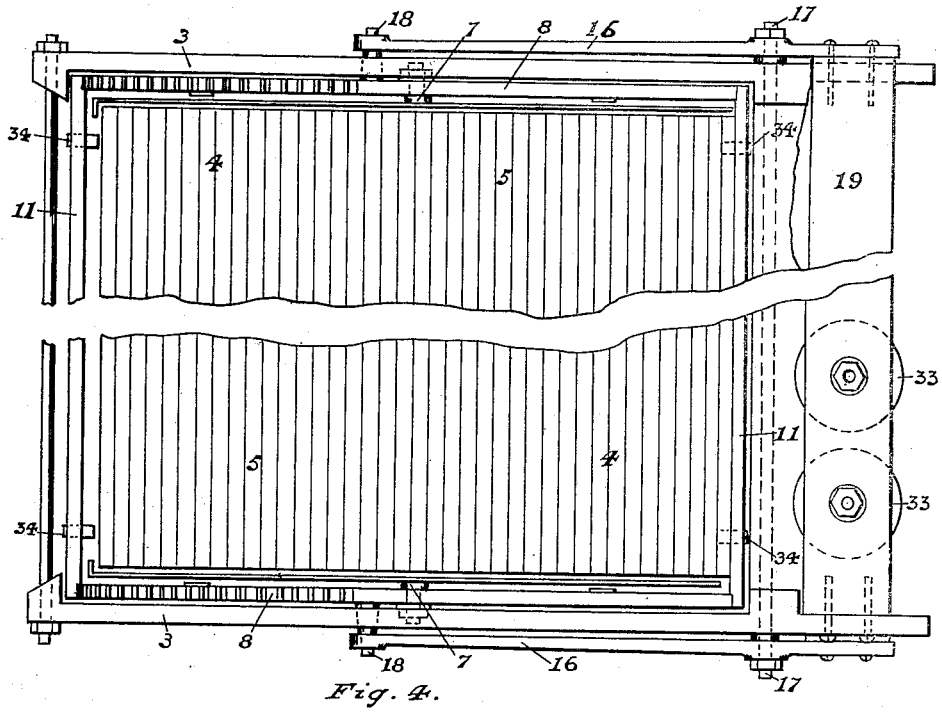
Figure 5:
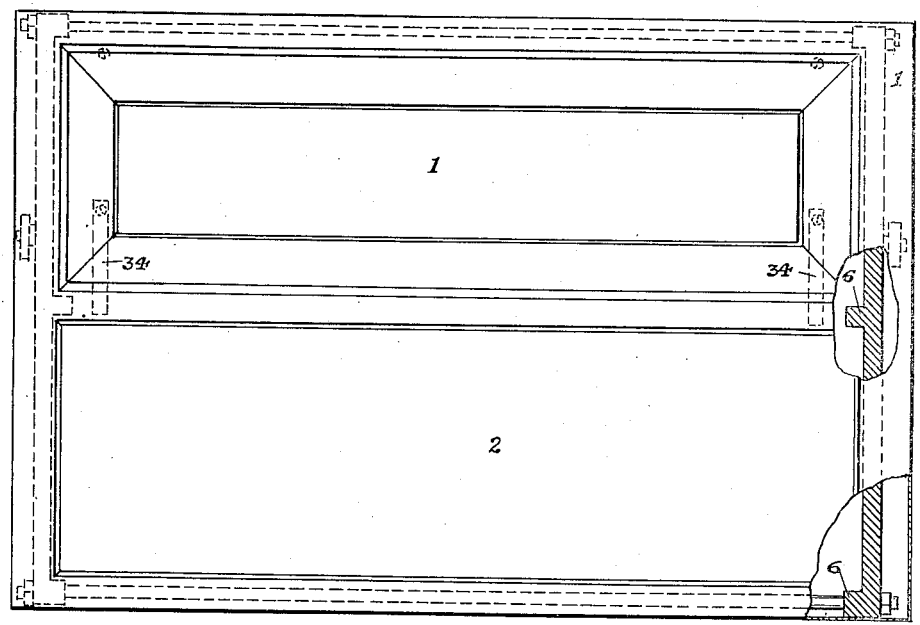
Figure 9:
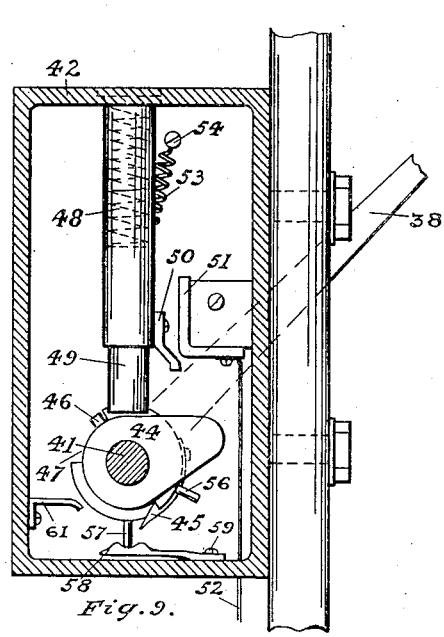
Figure 10:
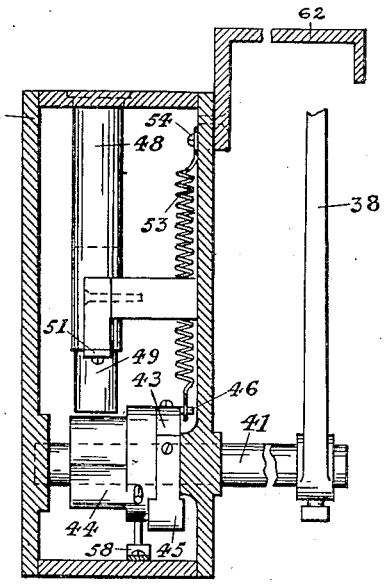
Figures 6, 7, 8:
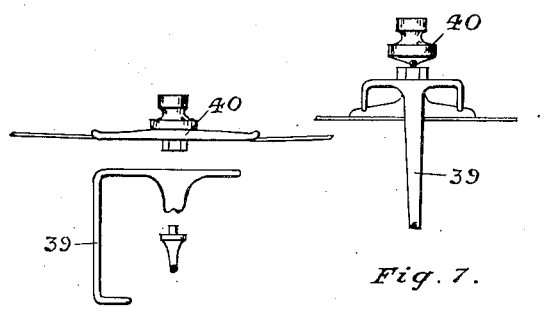

Figure 1 is an end view of the machine, the case removed, showing a magnet, armature and racks, one of the cog-wheels, and bell-crank levers and the connecting-levers, a plurality of card-feeders and their connecting attachments. Fig. 2 is an edge detail of mechanism which feeds the cards horizontally. Fig. 3 is a side view of the same, showing the card-feeder and spring-pawl. Fig. 4 is a top view of the device, broken apart and the case omitted, showing the elevators and their spring-pawls operating the cards vertically, the cogged wheels, their lever connections at each end, and an electromagnet. Fig. 5 is a front view of a machine-case and the glass face back of which the cards with names of streets or stations and advertisements appear, the case broken away to show a cross-section of the frame and card-rests. Fig. 6 is a side view of a trolley-wire, a trolley-hanger to which is fastened a switch-block, and a trolley-pole and wheel and trolley-switch. Fig. 7 is a detail side view of a trolley-hanger, showing the switch-block attached. Fig. 8 is a detail end view of the trolley-hanger, showing the manner in which the switch-block may be attached between the component parts of the trolley-hanger. Fig. 9 is a vertical side view cross-section of a trolley-switch, showing the shaft and cams carried thereby, an automatic time circuit-closer, the springs, and a block that unlocks the cams, the operating-lever, and the insulated block from which the wire broken away extends that connects with and operates the machine; and Fig. 10 is a vertical end view cross-section of said trolley-switch.

Similar numerals refer to similar parts throughout the several views.

Numeral 1 is the case of the machine, and 2 is a glass front therein.

3 3 are the parts of the frame of the machine.

4 4 represent card-frames for cards 5 5, which carry the names of streets and the advertisements. The ends are supported in tiers by horizontal rests 6 6. These rests are cast on the inside of the end pieces of frame 3 3. The name of the streets are shown by exposing the front card of the lower tier, the consecutive streets being shown by repeatedly transferring the front card of the lower tier to the front of the upper tier and simultaneously transferring the back card of the upper tier to the back of the lower tier. Each tier contains the names of the route one way. By the proper disposition of the cards in two tiers we are able to show the streets going and coming without reversing the action of the machine.

7 is a shaft carried in bearings on the end pieces of the frame 3 3. 8 8 are gear-wheels carried by and rigidly attached to said shaft. Said gear-wheels operate racks 9 9 at the front and 10 10 at the rear. These racks are cut in the ends of elevators 11 11, which elevators work up and down in vertical slots cut on the inside of the ends of the machine-frame. Said gear-wheels carry cams 12 12, which operate pins 13 13 in blocks 14 14, which blocks are operated in slots cut in the ends of card-rests 6 6 by the upper cam-face 12 striking on the front side of pin 13 to close the space between the ends of the card rests and the elevators and by lower cam-face 12 striking on the back side of said pin 13 to open said space. The object of said blocks is to automatically close and open the space between the ends of the card rests and the elevators, thus governing the passage of said cards from the upper to the lower tier..

16 16 are levers pivotally attached to the machine-frame by pins 17 17, their inner ends slotted to engage with pins 18 18 on gear-wheels 8 8. The outer ends of these levers are rigidly fastened to the ends of armature 19, which extends horizontally across the back of the machine.

The cards are operated horizontally by means of card-feeders 20 20. Said feeders each consists of a steel plate turned L shape at the front end for the top feeders and L shape at the rear end for the lower feeders. They operate between the ends of the cards and the inside of the end frame 3 and are fastened to the frame by means of shouldered pins 21 21, fastened rigidly to the card-feeders and working in horizontal slots in said frame. The square-shouldered pins 22 22 are rigidly fastened to said card-feeders.

23 23 are spring-pawl levers fastened to frame-pieces 3 3. The upper and lower card-feeders are connected by levers 24 24, pivoted at 25 and fastened to the card-feeders by the pins at 21 21.

26 is a bell-crank lever pivoted to the frame at 27. The crank 26 is connected to lever 24 by means of the link 28 and to armature 19 by means of link 29, slotted at the lower end, so as to fit over pin 30 in the end of the armature, the slot allowing the armature to move down independent of the link 29.

31 31 are coil-springs connecting with the card-feeders at 21 21 and attached to the frame at 32 32.

33 is an electromagnet that on being subjected to an electric circuit attracts the armature 19 and simultaneously first operates levers 16 16 and rotates gear-wheels 8 8, carrying racks 9 9 and 10 10 with their attached elevators 11 11, the front elevators 11 being lowered to engage the front card of the lower tier, the back elevator being raised to engage the back card of the upper tier, and said engagement being perfected by means of spring-pawls 34 34, fastened to the elevators, and, second, the bell-crank 26, with links 28 and 29 and lever 24, moves the card-feeders 20 20, so that their outer ends are in line with the card-elevators. The pins 22 22 are engaged by the pawl-levers 23 23. On the circuit being broken the springs 15 15, attached to armature 19 and to frame 3, pull the armature down, and with it the levers 16 16 rotate the gear 8 with the racks and elevators, the front elevator transferring the front card of the lower tier to the front of the upper tier, the back elevator transferring the back card of the upper tier to the back of the lower tier. The pawl-levers 23 23 on being touched by the cams 35 35 release the pins 22 22, allowing the springs 31 31 to pull the card-feeders against the cards, thus moving them horizontally into the new position due to the transfer.

In order to operate the aforesaid indicator successfully, it is necessary to provide a mechanism that will positively close the circuit a sufficient length of time once for each block to allow the magnets to act on the armature. This office is performed by means of a switch-box fastened to the upper end of the trolley-pole and connected through the machine to the ground by wire. The circuit in switch is closed by coming in contact with a switch-block placed on the trolley-hanger, one for each street. In case the car should be run past said switch-block, then for any reason be backed past it, upon resuming its journey in passing the block the second time the second street ahead would be shown instead of the first, as should be, unless provision were made to remedy such occurrences. To give time for the magnets to act properly at all rates of speed of the car and at the same time to provide for automatic adjustment in case of backups is the function performed by the trolley-switch hereinafter described.

36 is a trolley-switch attached to trolley-pole 37, as shown in Fig. 6. This trolley-switch is operated by lever 38 passing switch-block 39, said block being fastened to the trolley-hanger 40, as shown in Figs. 7 and 8.

41 is a shaft that works in bearings in the switch-case 42. To the shaft is attached rigidly the lever 38 and the cam 43. Cam 44 is loose on shaft 41, but is held to its position by the spring-pawl 45, stationary on cam 43 and fitting on a corresponding rest in cam 44. Stud-pin 46 is fastened rigidly to cam 43 and extends parallel to shaft 41. It is of sufficient length to extend across cams 43 and 44 and limits the relative position of said cams to the distance of one stroke of lever 38, said pin 46 moving to either end of curved rest 47 on cam 44.

48 is an air-tube which receives the plunger 49, carrying brush 50, which when the circuit is closed contacts with the insulated block 51, to which is fastened wire 52, leading to the machine. 53 is a spring fastened to cam 43 by pin 46 and to the frame 42 at 54. Said air-tube may be constructed of varying lengths, and said plunger may fit tight or loose, causing the air to enter slow or fast, and thus regulate the time of contact. Said spring pulls the shaft back to center after the lever has made a stroke in passing a switch-block. When the switch 36 passes block 39 as the car is moving forward, the lever takes the position shown at 55 in Fig. 6. The cam 44 drives the plunger 49 into tube 48, wiping brush 50 against the block 51.

56 57 are stud-pins in cam 44.

58 is a spring fastened to frame 42 at 59 in Fig. 9. Pin 57 brushing on spring 58 holds the cams on center. Should the car back past switch-block 39, the lever 38 would take position 60, as shown on Fig. 6. The shaft 41 would move backward one stroke. The pawl 45 would strike block 61 and unlock cams 43 and 44. The pin 56 would brush spring 58 and hold cam 44 stationary, while the shaft was pulled to the center. Pin 46 would move to the opposite end of slot 47. When the switch moves forward past the first block, the cam 44 is pulled one stroke forward. Pin 57 is again pulled to brush spring 58 and holds cam 44 stationary while the shaft is pulled on center and the spring pawl 45 drops in place, locking the cams in their normal position. Now when the second block is passed the second instead of third street will be shown.

62 is a guard attached to the switch-box to prevent the lever closing the circuit in case the trolley should leave the wire.

What I claim, and desire to secure by Letters Patent, is—

1. In an automatic street or station indicator and advertiser, the combination of a case provided with a glass front to permit a view of the street or station names or numbers and the advertisements, a frame provided with vertical slots cut in its end pieces, duplicate gear-wheels and a shaft carried by bearings on the end pieces of the frame, front and rear elevators adapted to travel up and down and racks on the ends thereof adapted to be operated by said gear-wheels, a plurality of card-frames, spring-pawls attached to said elevators to engage said card-frames, cards and horizontally-slotted rests for supporting the same in tiers, pins and blocks operating in said slotted rests to automatically open and close the space between the ends of the card rests and elevators, duplicate levers slotted at their inner ends, pivotally attached to the frame and engaging at their inner slotted ends with pins in the gear-wheels, L-shape upper and lower card-feeders provided with pins adapted to operate in slots in the frame, duplicate levers connecting and operating the upper and lower card-feeders, coil-springs forming connection between the frame and card-feeders, duplicate bell-cranks and connecting-links, levers and spring-pawls and square-shouldered pins, which simultaneously move the card-feeders into position to engage and operate the cards horizontally after they are transferred vertically, and duplicate springs to move the mechanism forming connection with the card-elevators, and transfer the cards.

2. In an automatic street or station indicator and advertiser the combination with a circuit-closer, of a case provided with a glass front to permit a view of the street or station names or numbers and the advertisements, a frame provided with vertical slots cut in the end pieces thereof, duplicate gear-wheels and a shaft carried by bearings on the end pieces of the frame, pins rigidly fastened to said gear-wheels, front and rear elevators adapted to travel up and down and racks on the ends thereof, adapted to be operated by said gear-wheels, a plurality of card-frames, cards and horizontally-slotted rests for supporting the same in tiers, pins and blocks operating in said slotted rests to automatically open and close the spaces between the ends of the card rests and elevators, cams attached to said gear-wheels adapted to engage said pins in said blocks and move them forward or backward, an armature extending horizontally across the back of said machine, duplicate levers slotted at their inner ends pivotally attached to the machine-frame rigidly fastened to said armature and engaging at their inner slotted ends with the pins in the gear-wheels, L-shaped card-feeders provided with pins adapted to operate in slots in the frame, duplicate levers connecting and operating the upper and lower card-feeders, coil-springs forming connection between the frame and card-feeders, duplicate bell-cranks and connecting-links, an electromagnet adapted to attract the armature which operates the mechanism forming connection with the card-elevators and moving said elevators into position to engage the cards, spring-pawls attached to said elevators and adapted to engage the card-frames, duplicate springs attached to said armature to recover said movement of the mechanism and transfer the cards, square-shouldered pins fastened rigidly to said card-feeders, spring-pawls fastened to the machine-frame and adapted to engage and hold said pins after said card-feeders have been moved into position to engage the cards, cams attached to said gear-wheels to release said square-shouldered pins from said spring-pawls after the cards are completely elevated allowing said coil-springs to pull said card-feeders against the cards thus transferring them horizontally after they have been transferred vertically, substantially as shown and described.

3. In an automatic street or station indicator and advertiser, the combination of a machine-frame, duplicate gear-wheels and a shaft carried by bearings on the end pieces of said frame, front and rear elevators adapted to travel up and down and racks on the ends thereof adapted to be operated by said gear-wheels, spring-pawls attached to said elevators, card-frames adapted to be engaged by said pawls, an armature extending horizontally across the back of the machine, duplicate levers slotted at their inner ends pivotally attached to the machine-frame rigidly fastened to the armature and engaging at their inner slotted ends with pins in the gear-wheels, an electromagnet adapted to attract the armature and operate the mechanism forming connection with the card-elevators and move the elevators into position to engage the cards, duplicate springs attached to said armature to recover said movement of mechanism and transfer the cards, substantially as shown and described.

4. In an automatic street or station indicator and advertiser, a machine-frame, L-shape card-feeders provided with pins adapted to operate in slots in said frame, duplicate levers connecting and operating the upper and lower card-feeders, coil-springs forming connection between the frame and card-feeders, duplicate bell-cranks and connecting-levers, an armature, an electromagnet adapted to attract said armature which operates the mechanism forming connection with the card-feeders, square-shouldered pins fastened rigidly to said card-feeders, card-frames, spring-pawls fastened to the machine-frame and adapted to engage and hold said pins after said card-feeders have been moved into position to engage said card-frames, cams attached to said gear-wheels to release said square-shouldered pins from said spring-pawls after the cards are completely elevated allowing said coil-springs to pull said card-feeders against the cards thus transferring them horizontally, substantially as shown and described.

5. In an automatic street or station indicator and advertiser the combination with slotted card rests and elevators, of blocks and pins operating in said slotted card-rests to automatically open and close the spaces between the ends of said card rests and elevators, a machine-frame, duplicate gear-wheels and a shaft carried by bearings on the end pieces of said frame, duplicate cams attached to said gear-wheels adapted to engage said pins in said blocks and move said blocks forward and backward an armature extending horizontally across the back of said machine duplicate levers slotted at their inner ends pivotally attached to the machine-frame rigidly fastened to said armature and engaging at their inner slotted ends with pins in the gear-wheels, an electromagnet adapted to attract said armature which operates the mechanism forming connection with the blocks in the slotted rests, substantially as set forth and shown.

In testimony whereof I affix my signature in presence of two witnesses.

GERALD R. LIVERGOOD.

Witnesses:
 REX LARCOM,
 LOTO VIGUS.